(12) United States Patent
Takeshita et al.

(10) Patent No.: US 10,459,313 B2
(45) Date of Patent: Oct. 29, 2019

(54) LENS BARREL AND IMAGING DEVICE (71) Applicant: FUJIFILM Corporation, Tokyo (JP)

(72) Inventors: Yukitaka Takeshita, Saitama (JP); Mitsuhiko Oka, Saitama (JP); Shiro Hashimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 62 days.

(21) Appl. No.: 15/920,658

(22) Filed: Mar. 14, 2018

(65) Prior Publication Data
US 2018/0203329 A1 Jul. 19, 2018

Related U.S. Application Data (63) Continuation of application No. PCT/JP2016/077001, filed on Sep. 13, 2016.

(30) Foreign Application Priority Data

Sep. 15, 2015 (JP) ................... 2015-181840

(51) Int. Cl.
*G02B 9/00* (2006.01)
*G03B 7/01* (2014.01)
(Continued)

(52) U.S. Cl.
CPC .............. *G03B 7/01* (2015.01); *G02B 7/14* (2013.01); *G03B 13/32* (2013.01); *G03B 17/14* (2013.01);
(Continued)

(58) Field of Classification Search
CPC ...................................................... G03B 7/01
(Continued)

(56) References Cited

U.S. PATENT DOCUMENTS

2013/0163979 A1 6/2013 Kuroiwa et al.
2017/0010475 A1* 1/2017 Minamisawa ....... H04N 5/2254

FOREIGN PATENT DOCUMENTS

JP 57-707 U 1/1982
JP 58-165615 A 9/1983
(Continued)

OTHER PUBLICATIONS

International Preliminary Report on Patentability and Written Opinion of the International Searching Authority (forms PCT/IPEA/409, PCT/ISA/237 and PCT/IPEA/416), dated Jan. 23, 2018, for International Application No. PCT/JP2016/077001, with an English translation of the IPRP.

(Continued)

*Primary Examiner* — James C. Jones
(74) *Attorney, Agent, or Firm* — Birch, Stewart, Kolasch & Birch, LLP (57) ABSTRACT

A lens barrel includes an imaging optical system, a diaphragm operation ring, and click-stop mechanisms. The click-stop mechanism includes a first spherical body, first fitting portions, and a first biasing member. The click-stop mechanism includes a second spherical body, second fitting portions, and a second biasing member. The first spherical body is fitted to the first fitting portion in a case in which the diaphragm operation ring is set to a position corresponding to main series. The second spherical body is fitted to the second fitting portion in a case in which the diaphragm operation ring is set to a position corresponding to subordinate series.

5 Claims, 10 Drawing Sheets

(51) Int. Cl.
  *G03B 13/32*    (2006.01)
  *G03B 17/14*    (2006.01)
  *G02B 7/14*     (2006.01)
  *H04N 5/225*    (2006.01)
  *H04N 5/232*    (2006.01)
  *H04N 5/374*    (2011.01)
(52) U.S. Cl.
  CPC ....... *H04N 5/2254* (2013.01); *H04N 5/23216* (2013.01); *H04N 5/374* (2013.01)
(58) Field of Classification Search
  USPC ....................................................... 359/739
  See application file for complete search history.

(56) References Cited

FOREIGN PATENT DOCUMENTS

| JP | 8-278434 A    | 10/1996 |
| JP | 2000-348567 A | 12/2000 |
| JP | 2013-134425 A | 7/2013  |

OTHER PUBLICATIONS

International Search Report (form PCT/ISA/210), dated Dec. 13, 2016, for International Application No. PCT/JP2016/077001, with an English translation.

* cited by examiner

LENS BARREL AND IMAGING DEVICE

CROSS-REFERENCE TO RELATED APPLICATIONS

This application is a Continuation of PCT International Application No. PCT/JP2016/077001 filed on 13 Sep. 2016, which claims priority under 35 U.S.C. § 119(a) to Japanese Patent Application No. 2015-181840 filed on 15 Sep. 2015. The above application is hereby expressly incorporated by reference, in its entirety, into the present application.

BACKGROUND OF THE INVENTION

1. Field of the Invention

The present invention relates to a lens barrel and an imaging device including a variable diaphragm.

2. Description of the Related Art

A camera, such as a single-lens reflex camera for an expert, has a manual diaphragm-adjustment function that allows a user to manually adjust a diaphragm. In the camera having the manual diaphragm-adjustment function, for example, an operation ring to be operated by a user is provided and the diaphragm can be selected according to the rotational position of the operation ring.

JP1982-707U (JP-S57-707U) discloses a camera including a click-stop mechanism that click-stops an operation ring in accordance with each diaphragm value. The click-stop mechanism includes a plurality of fitting portions, a spherical body, and a biasing member. The plurality of fitting portions are formed on the inner peripheral surface of the operation ring, and corresponds to the respective diaphragm values. The spherical body is provided between the operation ring and a lens barrel body. The biasing member biases the spherical body to the fitting portions of the operation ring. Accordingly, in a case in which the operation ring is rotated, the spherical body is fitted to the fitting portion at a position corresponding to each diaphragm value. A user feels vibration through the operation ring in a case in which the spherical body is fitted to the fitting portion. Hereinafter, the vibration, which is felt by the user, is referred to as a click feeling. A user can recognize that the operation ring is set to a position corresponding to a predetermined diaphragm value through a click feeling.

In the past, there have been many cases in which a diaphragm value where an AV value is set to a predetermined integer value is used as a diaphragm value used in a camera. The series of a diaphragm value where the AV value is an integer are referred to as main series. Subordinate series, which are the series of a diaphragm value where the AV value is a predetermined fraction value, are also used to more finely set a diaphragm value. The subordinate series includes, for example, series where an AV value is set to n/3 (n is a positive integer except for multiples of 3) and series where an AV value is set to n/2 (n is a positive integer except for multiples of 2).

SUMMARY OF THE INVENTION

In the camera disclosed in JP1982-707U (JP-S57-707U), a click feeling is obtained only in a case in which the operation ring is matched with a position corresponding to a diaphragm value of the main series, and subordinate series are not considered. In a camera in which an operation ring can be set to a rotational position corresponding to a diaphragm value of subordinate series (hereinafter, referred to as a second rotational position) in addition to a rotational position corresponding to a diaphragm value of main series (hereinafter, referred to as a first rotational position) as in cameras of recent years, it is desired that different click feelings are obtained at the first and second rotational positions so that a user can identify a difference between the first and second rotational positions by only a click feeling at the time of operation of the operation ring.

A method of making the sizes of fitting portions, to which a spherical body is to be fitted, vary in the main series and subordinate series is considered to generate different click feelings at the first and second rotational positions. Specifically, there is considered a method of reducing a click feeling at the second rotational position in comparison with a click feeling at the first rotational position by making the size (for example, the width in the moving direction of the operation ring) of a fitting portion (hereinafter, referred to as a second fitting portion) corresponding to the second rotational position smaller than the size of a fitting portion (hereinafter, referred to as a first fitting portion) corresponding to the first rotational position.

However, in a case in which the size of the second fitting portion is made small, a click feeling at the second rotational position is reduced in comparison with a click feeling at the first rotational position but the spherical body is likely to be separated from the second fitting portion since a ratio of a portion of the spherical body to be fitted to the second fitting portion is reduced. That is, in a case in which the size of the second fitting portion is made small, a click feeling is reduced at the second rotational position and the holding ability of the spherical body to the second fitting portion deteriorates. Accordingly, the spherical body is separated from the second fitting portion with a small magnitude of a force applied to the operation ring.

An object of the invention is to provide a lens barrel and an imaging device in which a distinct difference in a click feeling is obtained in a case in which a diaphragm operation ring is matched with a first rotational position corresponding to main series and a case in which the diaphragm operation ring is matched with a second rotational position corresponding to subordinate series and holding ability of first and second fitting portions can be improved.

A lens barrel of the invention includes a lens barrel body, a diaphragm operation ring, first and second spherical bodies, first fitting portions, and second fitting portions. The lens barrel body receives a diaphragm. The diaphragm operation ring is rotatably mounted on the lens barrel body and is capable of being set to a plurality of first rotational positions where an AV value of the diaphragm is set to predetermined integer values and a plurality of second rotational positions where the AV value is set to predetermined fraction values. The first and second spherical bodies are provided between the lens barrel body and the diaphragm operation ring, and are disposed at positions different from each other in a circumferential direction of the diaphragm operation ring. The first fitting portions are formed on one of the lens barrel body and the diaphragm operation ring so as to correspond to the respective first rotational positions, and the first spherical body is fitted to the first fitting portion in a case in which the diaphragm operation ring is set to each of the first rotational positions. The second fitting portions are formed on one of the lens barrel body and the diaphragm operation ring so as to correspond to the respective second rotational positions, and the second spherical body is fitted to the second fitting portion in a case in which the diaphragm operation ring is set to each of the second rotational positions. A fitting amount of the first spherical body with respect to the first fitting portion is larger than a fitting amount of the second spherical body with respect to the second fitting portion. A ratio of the volume of a portion of the first spherical body fitted to the first fitting portion to the entire volume of the first spherical body is substantially equal to a ratio of the volume of a portion of the second spherical body fitted to the second fitting portion to the entire volume of the second spherical body.

It is preferable that the dimension of the first fitting portion is larger than the dimension of the second fitting portion in the circumferential direction of the diaphragm operation ring. It is preferable that the first and second fitting portions have rectangular shapes.

It is preferable that the diaphragm operation ring includes a first surface orthogonal to an axis of the lens barrel body, the lens barrel body includes a second surface that is orthogonal to the axis and faces the first surface, the first and second spherical bodies are disposed between the first and second surfaces, and the first and second fitting portions are formed on any one of the first and second surfaces.

It is preferable that the diaphragm operation ring is capable of being set to a third rotational position corresponding to an automatic exposure mode in which an automatic control of the diaphragm is performed, and the lens barrel further includes a third fitting portion which is formed on one of the lens barrel body and the diaphragm operation ring and to which the first spherical body is fitted in a case in which the diaphragm operation ring is set to the third rotational position and a fourth fitting portion which is formed on one of the lens barrel body and the diaphragm operation ring and to which the second spherical body is fitted in a case in which the diaphragm operation ring is set to the third rotational position.

An imaging device of the invention includes the lens barrel.

According to the invention, a distinct difference in a click feeling is obtained in a case in which a diaphragm operation ring is matched with a first rotational position corresponding to main series and a case in which the diaphragm operation ring is matched with a second rotational position corresponding to subordinate series, and holding ability of first and second fitting portions can be improved.

DESCRIPTION OF THE PREFERRED EMBODIMENTS

Figure 1:
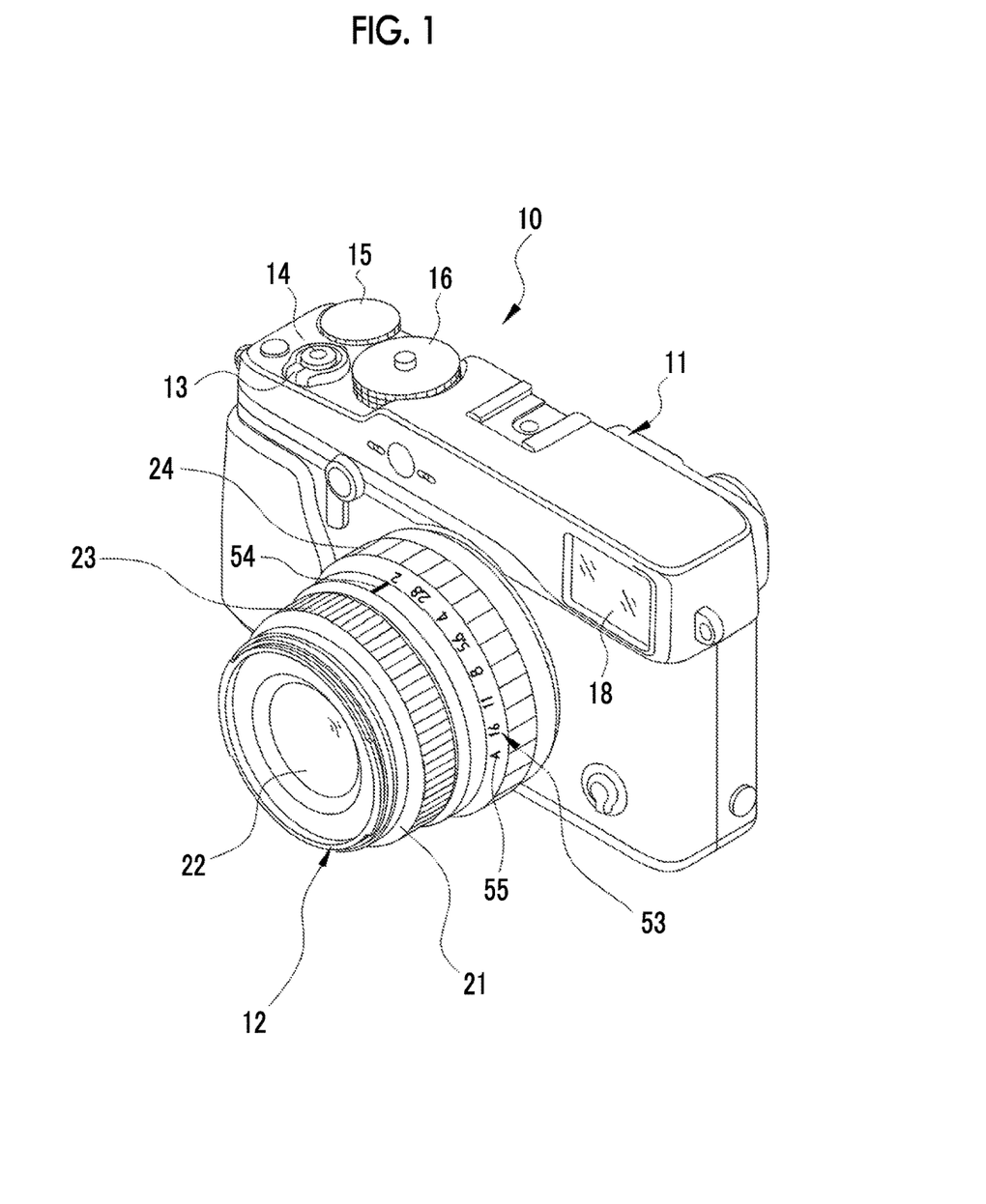
FIG. 1 is a perspective view showing the front appearance of a lens-interchangeable digital camera.
Figure 2:
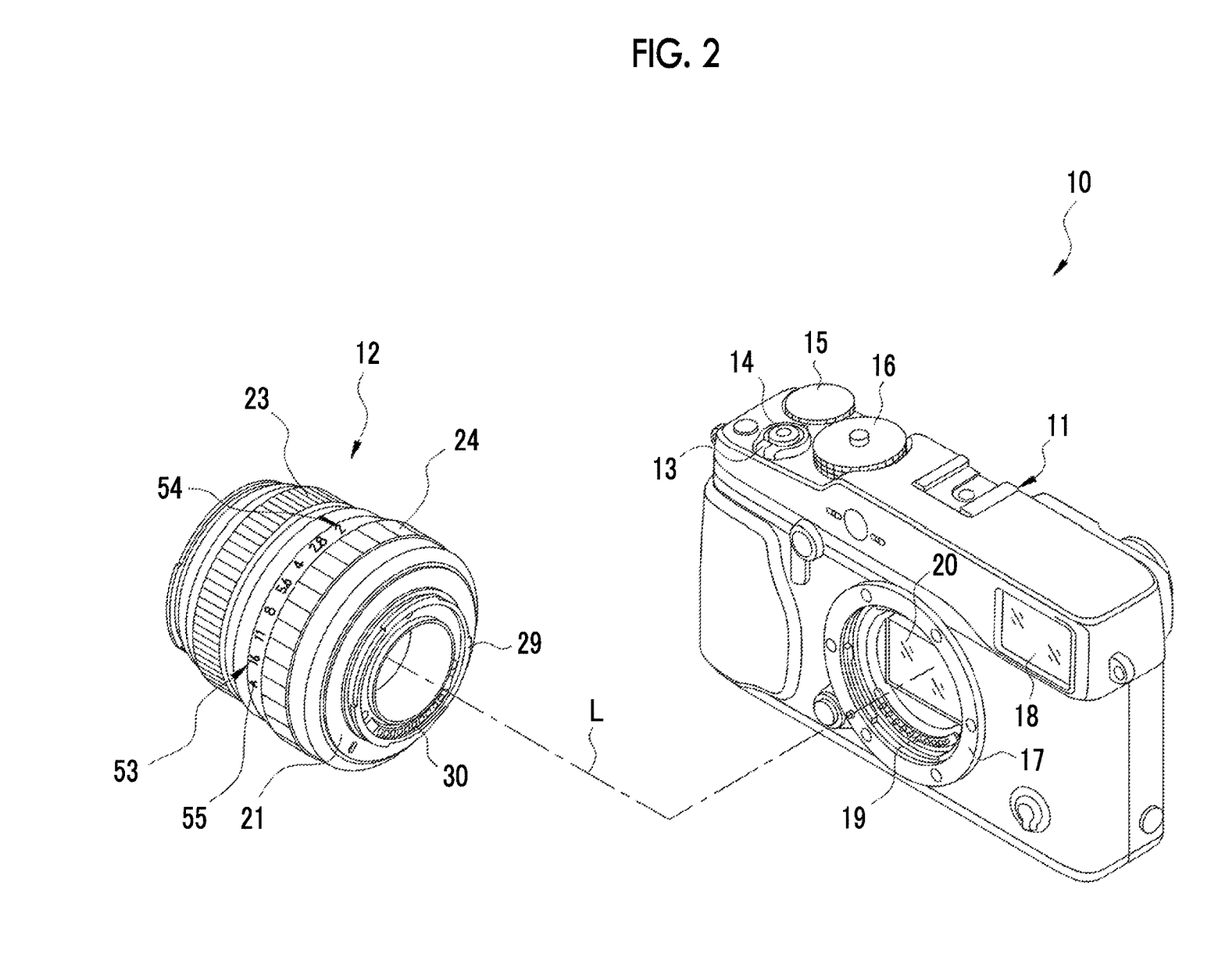
FIG. 2 is a perspective view showing the appearance of a lens barrel and a camera body.

In FIGS. 1 and 2, a lens-interchangeable digital camera (hereinafter, referred to as a camera) 10 includes a camera body 11 and a lens barrel 12. The lens barrel 12 is detachably connected to the camera body 11. The camera 10 is a mirrorless single-lens digital camera.

The camera body 11 includes a power lever 13, a release switch 14, an exposure correction dial 15, a shutter speed dial 16, and the like on the upper surface thereof. The release switch 14 is a two-stage stroke type switch that allows so-called "half press" and "full press". The release switch 14 outputs an S1-ON signal in a case in which the release switch is half pressed, and outputs an S2-ON signal in a case in which a full press where the release switch is further pressed from the half press is performed. In a case in which an S1-ON signal is output from the release switch 14, the camera 10 performs imaging preparation processing, such as automatic focusing (AF (Auto Focus) processing) or automatic exposure control. In a case in which an S2-ON signal is output from the release switch 14, the camera 10 performs imaging processing.

A mount 17 on which the lens barrel 12 is to be mounted and an optical finder window 18 are provided on the front surface of the camera body 11. A body-side signal contact 19, which is to be electrically connected to the lens barrel 12, and a solid-state imaging element 20 are provided in the mount 17. Further, an image display unit 43 (see FIG. 4), operation buttons, and the like are provided on the back surface of the camera body 11.

Figure 3:
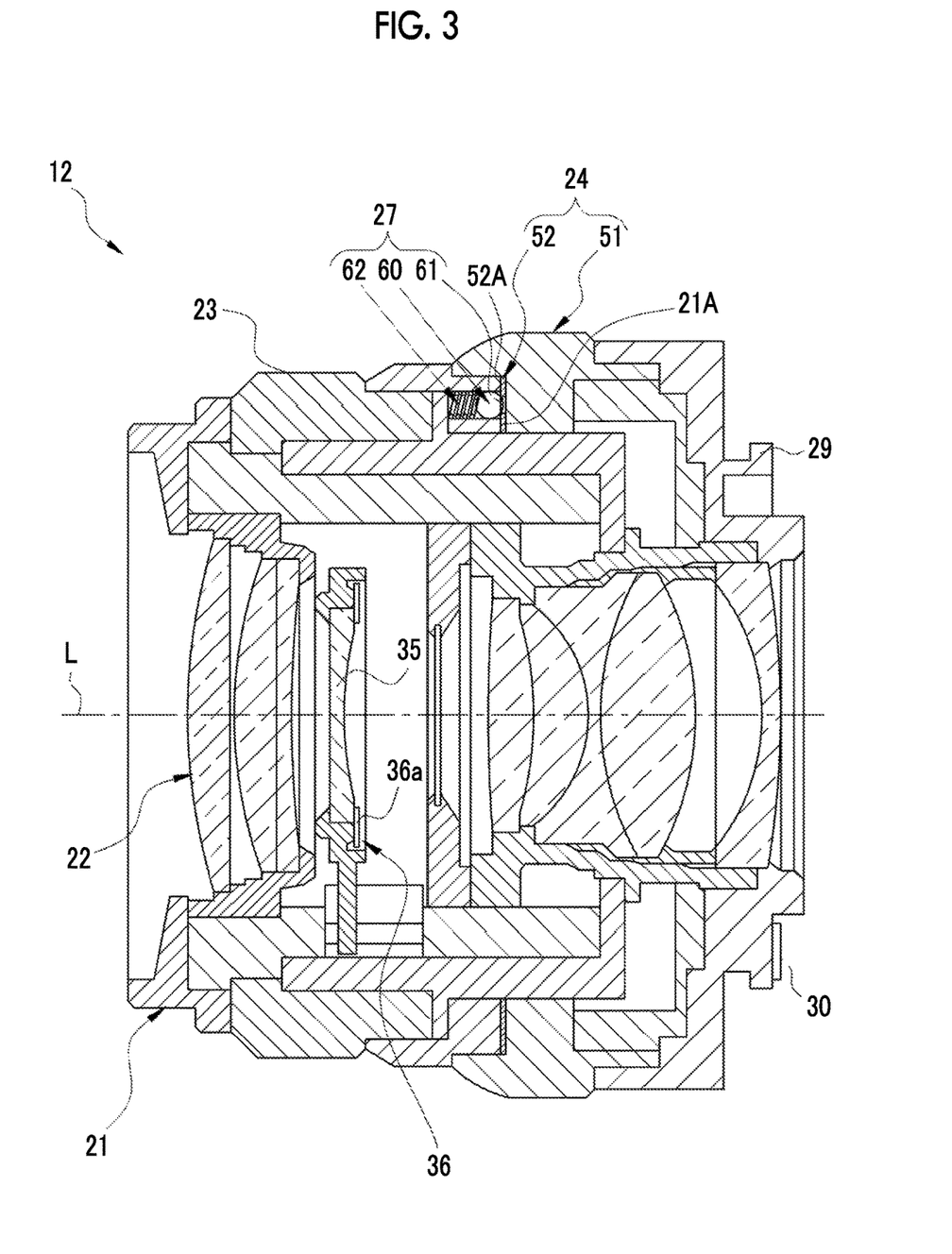
FIG. 3 is a cross-sectional view of main portions of the lens barrel.

As shown in FIG. 3, the lens barrel 12 includes a lens barrel body 21, an imaging optical system 22, a focus ring 23, a diaphragm operation ring 24, sensors 25 and 26 (see FIG. 4), click-stop mechanisms 27 and 28 (see FIG. 6), a lens mount 29, a lens-side signal contact 30, and the like. The lens barrel body 21 has a cylindrical shape, and receives the imaging optical system 22 therein. The lens mount 29 is provided at the rear end of the lens barrel body 21. In a case in which the lens barrel 12 is connected to the camera body 11, the imaging optical system 22 forms an image on the solid-state imaging element 20 with subject light. The solid-state imaging element 20 is an imaging unit that takes an image with light emitted from the lens barrel 12.

The lens mount 29 is detachably coupled to the mount 17 of the camera body 11. In a case in which the lens mount 29 of the lens barrel 12 is coupled to the mount of the camera body 11, the lens-side signal contact 30 is in contact with the body-side signal contact 19 and electrically connects the lens barrel 12 to the camera body 11.

Figure 4:
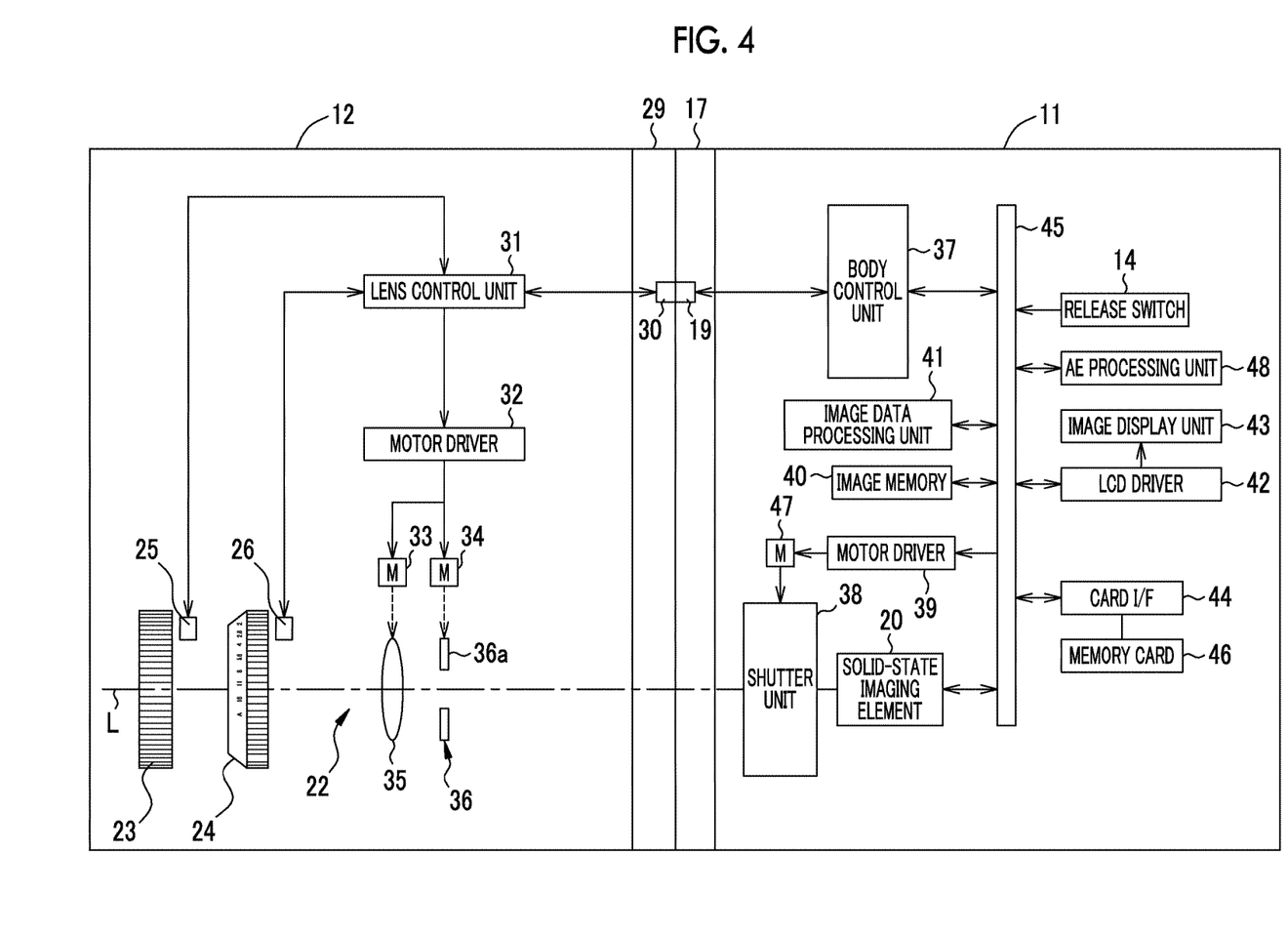
FIG. 4 is a block diagram showing the configuration of the lens-interchangeable digital camera.

As shown in FIG. 4, the lens barrel 12 includes a lens control unit 31, a motor driver 32, motors 33 and 34, and the like in addition to the imaging optical system 22, the focus ring 23, the diaphragm operation ring 24, the sensors 25 and 26, and the like.

The lens control unit 31 is formed of a microcomputer that includes a central processing unit (CPU), a read only memory (ROM) storing programs and parameters to be used in the CPU, a random access memory (RAM) used as a work memory of the CPU (all of them are not shown), and the like. The lens control unit 31 controls the respective parts of the lens barrel 12. The sensors 25 and 26 and the motor driver 32 are connected to the lens control unit 31.

The imaging optical system 22 includes a plurality of lenses including a focus lens 35, a diaphragm unit 36, and the like. The focus lens 35 is moved in the direction of an optical axis L by the driving of the motor 33 and adjusts an imaging distance. The diaphragm unit 36 moves a plurality of diaphragm blades 36a by the driving of the motor 34 to change the amount of light to be incident on the solid-state imaging element 20. The motor driver 32 controls the driving of the motors 33 and 34 on the basis of the control of the lens control unit 31.

The focus ring 23 is an operation member that is manually rotated by a user to adjust a focus. The focus ring 23 is mounted on the lens barrel body 21 so as to be rotatable about the optical axis L of the imaging optical system 22.

The sensor 25 detects the rotational direction and the rotation angle of the focus ring 23. The sensor 25 includes, for example, a comb-tooth ring (not shown) that is provided on the inner peripheral surface of the focus ring 23 and an optical sensor (not shown) that outputs a detection signal. The detection signal output from the sensor 25 is output to the lens control unit 31. The lens control unit 31 detects the rotational direction and the rotation angle of the focus ring 23 on the basis of the detection signal input from the sensor 25. Information on the rotational direction and the rotation angle of the focus ring 23, which are detected by the lens control unit 31, is output to a body control unit 37, which is provided in the camera body 11, through the lens-side signal contact 30 and the body-side signal contact 19.

The diaphragm operation ring 24 is an operation member that is manually rotated by a user to adjust a diaphragm. The diaphragm operation ring 24 is mounted on the lens barrel body 21 so as to be rotatable about the optical axis L of the imaging optical system 22.

For example, the sensor 26 is a position sensor that detects the rotational position of the diaphragm operation ring 24. A detection signal output from the sensor 26 is output to the lens control unit 31 as in the case of the detection signal output from the sensor 25. The lens control unit 31 detects the rotational position of the diaphragm operation ring 24 on the basis of the detection signal input from the sensor 26. Information on the rotational position of the diaphragm operation ring 24, which is detected by the lens control unit 31, is output to the body control unit 37, which is provided in the camera body 11, through the lens-side signal contact 30 and the body-side signal contact 19.

The body control unit 37 includes a CPU, a ROM that stores programs and parameters to be used in the CPU, a RAM that is used as a work memory of the CPU (all of them are not shown), and the like. The body control unit 37 controls the camera body 11 and the respective parts of the lens barrel 12 that are connected to the camera body 11. An S1 signal and an S2 signal are input to the body control unit 37 from the release switch 14. Further, the body-side signal contact 19 is connected to the body control unit 37.

A shutter unit 38 is a so-called focal-plane shutter and is disposed between the mount 17 and the solid-state imaging element 20. The shutter unit 38 is provided so as to be capable of blocking an optical path between the imaging optical system 22 and the solid-state imaging element 20, and is changed between an open state and a closed state. The shutter unit 38 is in an open state in a case in which a live view image and a video are to be taken. The shutter unit 38 is temporarily changed to a closed state from an open state in a case in which a static image is to be taken. The shutter unit 38 is driven by a shutter motor 47. A motor driver 39 controls the driving of the shutter motor 47.

The driving of the solid-state imaging element 20 is controlled by the body control unit 37. For example, the solid-state imaging element 20 is a CMOS image sensor, and includes a light-receiving surface that is formed of a plurality of pixels (not shown) arranged in the form of a two-dimensional matrix. Each of the pixels includes a photoelectric conversion element, and generates an imaging signal by photoelectrically converting the image of a subject that is formed on the light-receiving surface by the lens barrel 12.

Further, the solid-state imaging element 20 includes signal processing circuits, such as a noise removal circuit, an automatic gain controller, and an A/D conversion circuit, (all of them are not shown). The noise removal circuit performs noise removal processing on an imaging signal. The automatic gain controller amplifies the level of an imaging signal to an optimum value. The A/D conversion circuit converts an imaging signal into a digital signal and outputs the digital signal to a busline 45 from the solid-state imaging element 20. An output signal of the solid-state imaging element 20 is image data (so-called RAW data) that has one color signal for each pixel.

An image memory 40 stores image data corresponding to one frame that is output to the busline 45. An image data processing unit 41 reads the image data, which corresponds to one frame, from the image memory 40, and performs publicly known image processing, such as a matrix operation, demosaicing, y-correction, brightness/color difference conversion, and resizing.

An LCD driver 42 sequentially inputs the image data, which corresponds to one frame and has been subjected to image processing by the image data processing unit 41, to the image display unit 43. The image display unit 43 sequentially displays a live view image at a predetermined interval. A card I/F 44 is built in a card slot (not shown) provided in the camera body 11, and is electrically connected to a memory card 46 inserted into the card slot. The card I/F 44 stores the image data, which has been subjected to image processing by the image data processing unit 41, in the memory card 46. Further, in a case in which the image data stored in the memory card 46 is to be played back and displayed, the card I/F 44 reads the image data from the memory card 46.

The body control unit 37 sends a control signal, which allows the focus lens 35 to be moved according to the information on the rotational direction and the rotation angle of the focus ring 23 detected by the lens control unit 31, to the lens control unit 31. The lens control unit 31 controls the motor driver 32 on the basis of the control signal and moves the focus lens 35.

Figure 5:
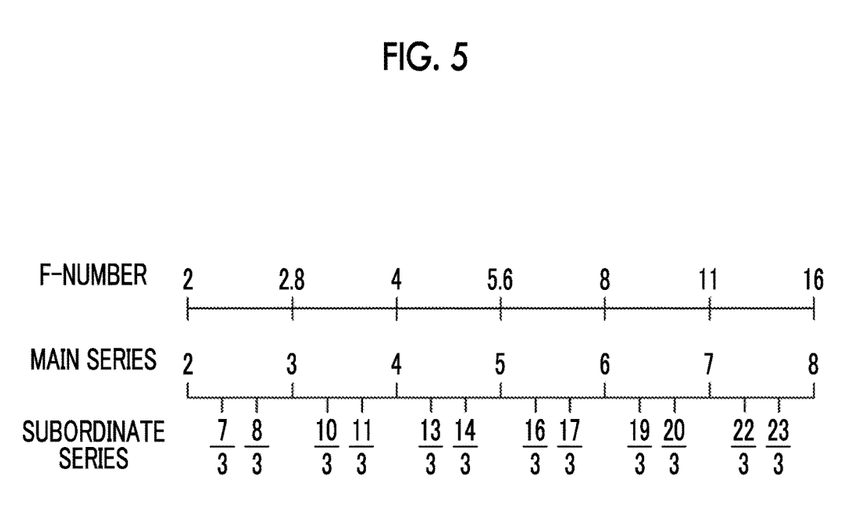
FIG. 5 is a diagram showing diaphragm values of main series and diaphragm values of subordinate series.

The diaphragm diameter of the diaphragm unit 36, which is to be changed according to the rotational position of the diaphragm operation ring 24, corresponds to diaphragm values of main series where an AV value is set to predetermined integer values and diaphragm values of subordinate series where an AV value is set to predetermined fraction values. In this embodiment, AV values to which the diaphragm values of the main series correspond are seven integer values of "2, 3, 4, 5, 6, 7, and 8" as shown in FIG. 5.

The diaphragm values of the subordinate series are values where an AV value is set to n/3 (n is a positive integer except for multiples of 3) in the range of the main series. In the case of this embodiment, AV values corresponding to the diaphragm values of the subordinate series are twelve fraction values of "7/3, 8/3, 10/3, 11/3, 13/3, 14/3, 16/3, 17/3, 19/3, 20/3, 22/3, and 23/3".

Further, since an F-number satisfies a relationship of "AV=2 log$_2$F" together with an AV value, the diaphragm values (F-numbers) of the main series correspond to "2, 2.8, 4, 5.6, 8, 11, and 16", respectively. The diaphragm values (F-numbers) of the subordinate series correspond to "2.2, 2.5, 3.2, 3.6, 4.5, 5, 6.4, 7.1, 9, 10, 13, and 14", respectively.

Since the diaphragm diameter of the diaphragm unit 36 is changed in the imaging optical system 22 of this embodiment as described above, the diaphragm diameter of the diaphragm unit 36 can be set to a total of nineteen diaphragm values of the main series and subordinate series (seven diaphragm values of the main series and twelve diaphragm values of the subordinate series).

The diaphragm operation ring 24 can be set to a plurality of first rotational positions at which the diaphragm value corresponds to the main series (an AV value is set to predetermined integer values) and a plurality of second rotational positions at which the diaphragm value corresponds to subordinate series (an AV value is set to predetermined fraction values). Seven first rotational positions and twelve second rotational positions exist in this embodiment.

Further, as the rotational position of the diaphragm operation ring 24, there are a rotational position, which is used to set an exposure mode to an automatic exposure mode, (hereinafter, a third rotational position) in addition to the first and second rotational positions corresponding to diaphragm values.

The body control unit 37 actuates the diaphragm unit 36 in accordance with information on the rotational position of the diaphragm operation ring 24 that is detected by the lens control unit 31, and sends a control signal, which changes the diaphragm diameter, to the lens control unit 31. The lens control unit 31 controls the motor driver 32 on the basis of the control signal sent from the body control unit 37, and controls the diaphragm diameter of the diaphragm unit 36 so that a diaphragm value corresponding to the rotational position of the diaphragm operation ring 24 is obtained. Furthermore, the body control unit 37 performs the automatic exposure mode in a case in which the rotational position of the diaphragm operation ring 24 detected by the lens control unit 31 is the third rotational position.

An AE processing unit 48 calculates an integrated value of the respective color signals from image data corresponding to one frame. In the case of the automatic exposure mode, the body control unit 37 calculates an exposure value on the basis of an integrated value calculated for each image corresponding to one frame, determines a shutter speed and a diaphragm value from this exposure value in accordance with a predetermined program diagram, and performs automatic control for the shutter unit 38 and the diaphragm unit 36. That is, the body control unit 37 controls the driving of the shutter motor 47 so that the determined shutter speed is obtained, and sends a control signal to the lens control unit 31. The lens control unit 31 controls the motor driver 32 on the basis of the control signal, and actuates the diaphragm unit 36 to a diaphragm diameter where the determined diaphragm value is obtained.

Figure 6:
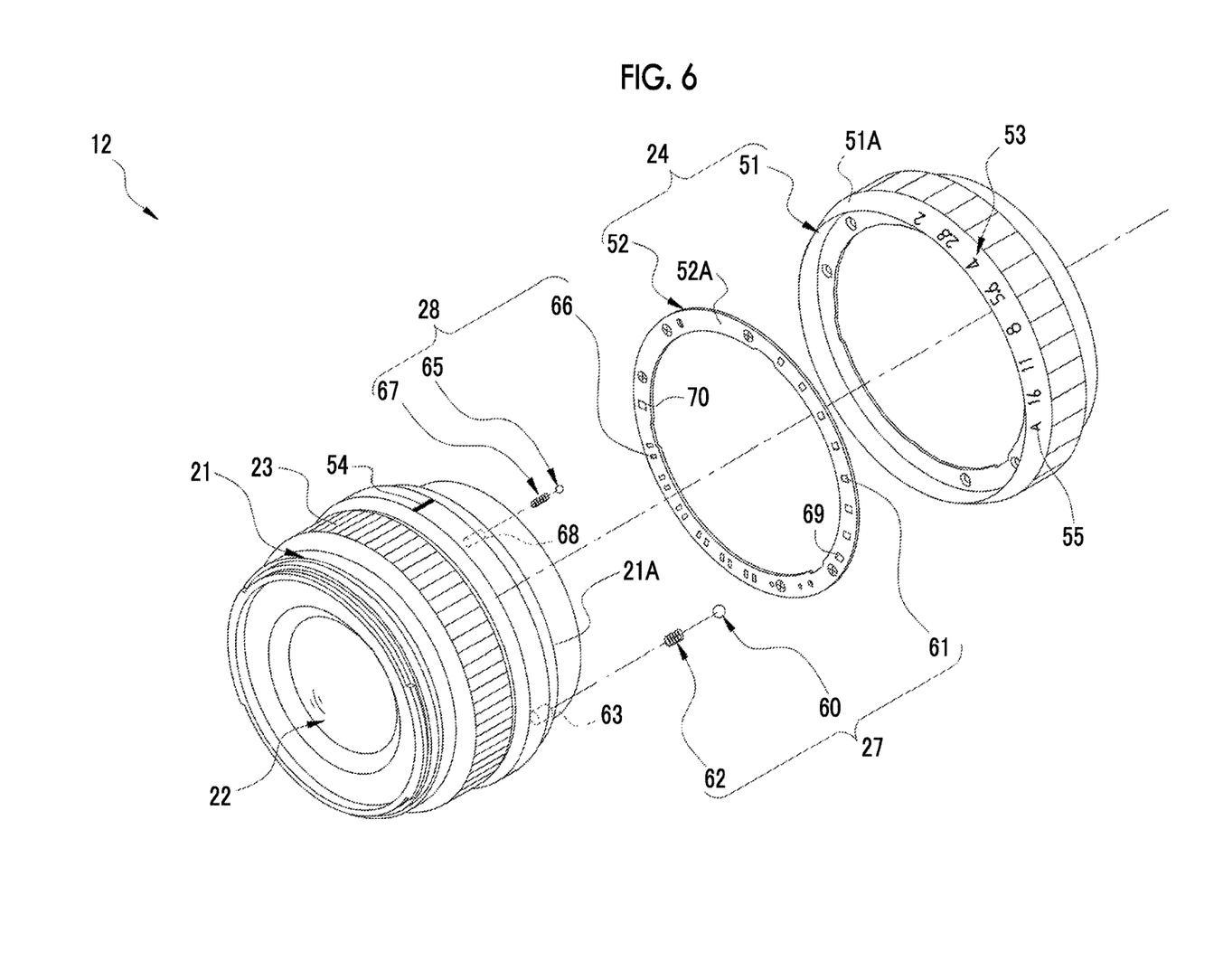
FIG. 6 is an exploded perspective view of a lens barrel body.
Figure 7:
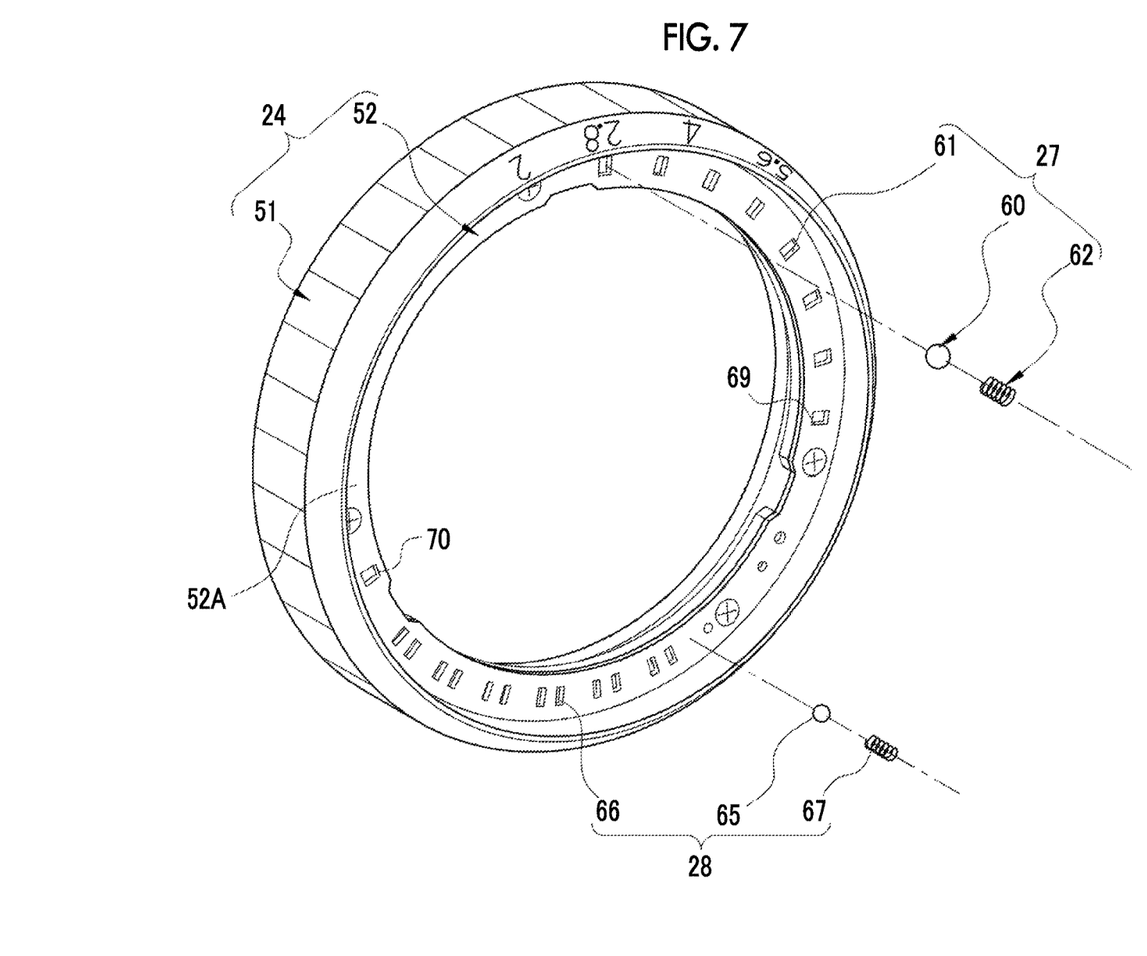
FIG. 7 is a perspective view of a diaphragm operation ring and first and second spherical bodies.

As shown in FIGS. 6 and 7, the diaphragm operation ring 24 includes an operation ring body 51 and a slit plate 52. The slit plate 52 is an annular thin plate. The slit plate 52 is disposed on the inner peripheral side of the operation ring body 51 so as to be orthogonal to the axis of the lens barrel body 21, and is fixed (for example, screwed) to the operation ring body 51.

A first surface 52A of the slit plate 52 facing a distal end is orthogonal to the axis of the lens barrel body 21. The lens barrel body 21 includes a second surface 21A that is orthogonal to the axis and faces the first surface 52A.

The operation ring body 51 has an annular shape, and includes a tapered surface MA of which the outer diameter is reduced toward the distal end. Diaphragm value scales 53 representing the diaphragm values of the main series are provided on the tapered surface 51A. An indicator 54 is provided on the lens barrel body 21. The diaphragm value scales 53 are disposed along the circumferential direction of the diaphragm operation ring 24. Specifically, values of "2, 2.8, 4, 5.6, 8, 11, and 16", which are diaphragm values (F-number) of the main series, are arranged in this order as the diaphragm value scales 53. The indicator 54 is a linear mark, and is provided at a position that is to be in contact with the distal end portion of the diaphragm operation ring 24.

The value of any one of the diaphragm value scales 53 is matched with the indicator 54, so that the diaphragm operation ring 24 is set to the first rotational position. Accordingly, the diaphragm unit 36 can be set to a diaphragm value of the main series corresponding to the diaphragm value scale 53. In a case in which the diaphragm operation ring 24 is set to the first rotational position, the body control unit 37 actuates the diaphragm unit 36 to a diaphragm diameter where the diaphragm value corresponding to the diaphragm value scale 53 is obtained in accordance with information on the rotational position of the diaphragm operation ring 24 that is detected by the lens control unit 31.

Further, a predetermined position (a position corresponding to any one of trisected intervals of an interval) between two adjacent values of the diaphragm value scales 53 is matched with the indicator 54, so that the diaphragm operation ring 24 is set to the second rotational position. Accordingly, the diaphragm unit 36 can be set to a diaphragm value of the subordinate series. In a case in which the diaphragm operation ring 24 is set to the second rotational position, the body control unit 37 actuates the diaphragm unit 36 to a diaphragm diameter where the diaphragm value of the subordinate series is obtained in accordance with information on the rotational position of the diaphragm operation ring 24 that is detected by the lens control unit 31.

Furthermore, a mark 55 of "A" is provided on the diaphragm operation ring 24 outside the diaphragm value scales 53, that is, outside the value of "16" in this embodiment in the circumferential direction. The mark 55 corresponds to the above-mentioned third rotational position. The mark 55 is matched with the indicator 54, so that the diaphragm operation ring 24 can set an exposure mode to the automatic exposure mode from a manual exposure mode.

A click-stop mechanism 27 includes a first spherical body 60, first fitting portions 61, and a first biasing member 62. The first spherical body 60 is disposed between the slit plate 52 and the lens barrel body 21. Specifically, the first spherical body 60 is disposed between the first surface 52A of the slit plate 52 and the second surface 21A of the lens barrel body 21.

The lens barrel body 21 is provided with a mounting portion 63 in which the first spherical body 60 and the first biasing member 62 are mounted. The mounting portion 63 is a recessed portion that is formed at a position facing the slit plate 52. In the mounting portion 63, the first biasing member 62 is disposed on the distal end side of the lens barrel body 21 and the first spherical body 60 is disposed on the proximal end side of the lens barrel body 21. For example, a coil spring is used as the first biasing member 62 and the first biasing member 62 biases the first spherical body 60 to the slit plate 52.

Figure 8:
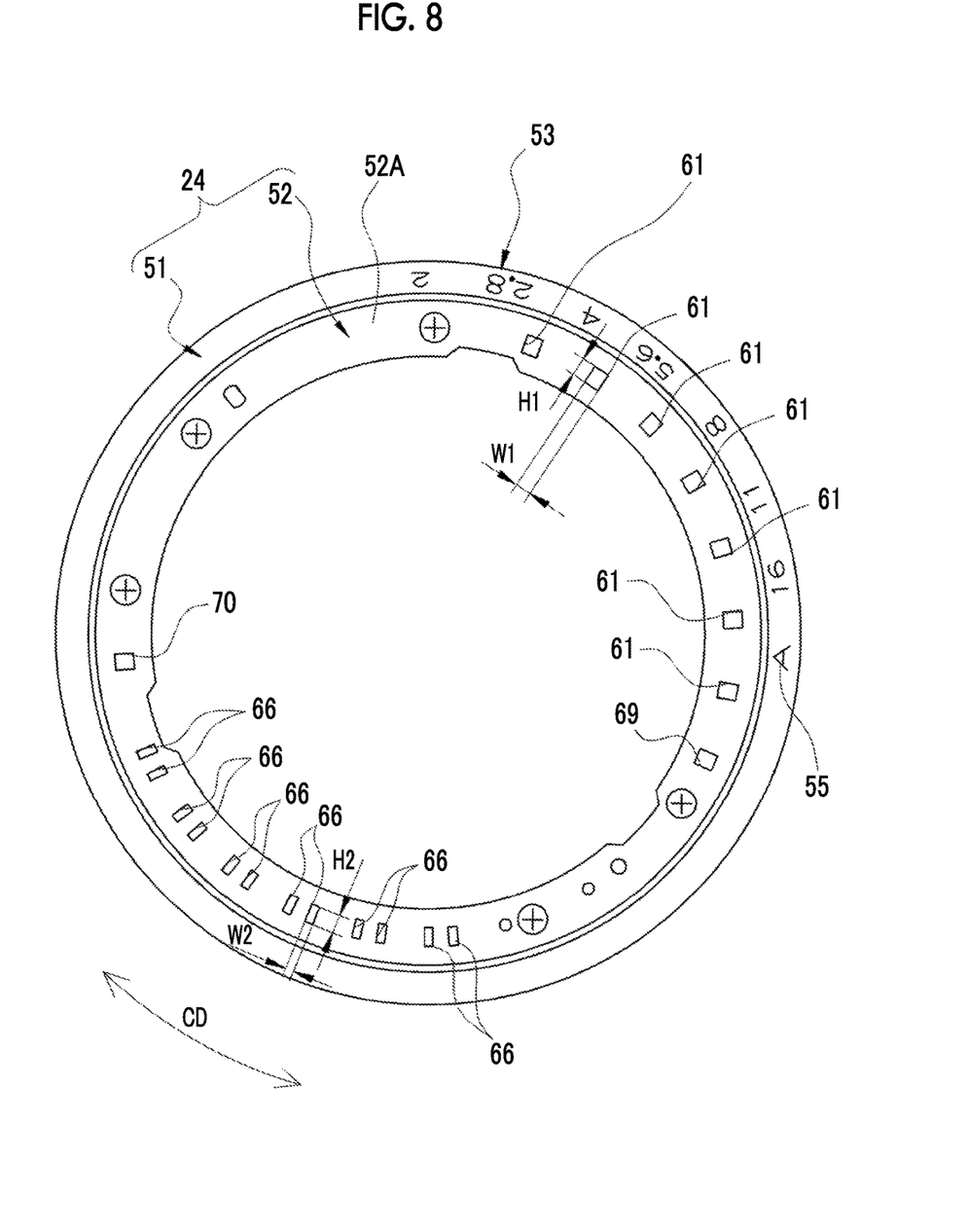
FIG. 8 is a front view of the diaphragm operation ring viewed from a distal end side.

As shown in FIG. 8, a plurality of first fitting portions 61 are formed at the slit plate 52. The first fitting portion 61 is a rectangular slit, and the height H1 of the first fitting portion 61 in a radial direction of the diaphragm operation ring 24 is larger than the width W1 of the first fitting portion 61 in a circumferential direction CD of the diaphragm operation ring 24. Accordingly, in a case in which the first spherical body 60 is fitted to the first fitting portion 61, the first spherical body 60 comes into contact with edge portions of the first fitting portion 61 orthogonal to the circumferential direction CD and does not come into contact with edge portions of the first fitting portion 61 orthogonal to the radial direction. Therefore, looseness can be prevented. Further, since the height H1 is set to be larger than the width W1, the machining accuracy of the first fitting portion 61 can be improved.

The first fitting portions 61 are formed so as to correspond to the first rotational positions, and the first spherical body 60 is fitted to the first fitting portion 61 in a case in which the diaphragm operation ring 24 is set to each first rotational position. Since seven first rotational positions exist in this embodiment as described above, seven first fitting portions 61 are formed at the slit plate 52.

Figure 9:
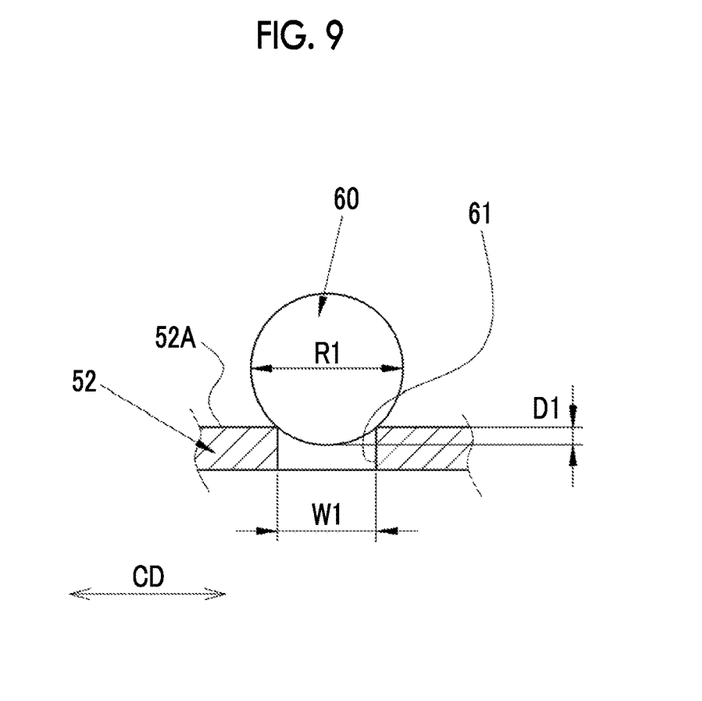
FIG. 9 is a cross-sectional view of main portions in a case in which the first spherical body is fitted to a first fitting portion.

In a case in which the position of the first spherical body 60 in the axial direction is regulated by the first surface 52A of the slit plate 52, the first spherical body 60 is positioned in the mounting portion 63. In a case in which the diaphragm operation ring 24 is set to each first rotational position, the first spherical body 60 protrudes toward the proximal end of the mounting portion 63 by the bias of the first biasing member 62 and is fitted to the first fitting portion 61. Further, since the first spherical body 60 collides with the edge portions of the first fitting portion 61 in a case in which the first spherical body 60 is fitted to the first fitting portion 61, vibration is generated.

A click-stop mechanism 28 includes a second spherical body 65, second fitting portions 66, and a second biasing member 67. The second spherical body 65 is disposed between the slit plate 52 and the lens barrel body 21. The second spherical body 65 is disposed at a position different from the position of the first spherical body 60 in the circumferential direction of the diaphragm operation ring 24. The outer diameter R1 of the first spherical body 60 is larger than the outer diameter R2 of the second spherical body 65 (see FIGS. 9 and 10). As in the case of the first spherical body 60, the second spherical body 65 is disposed between the first surface 52A of the slit plate 52 and the second surface 21A of the lens barrel body 21.

Figure 10:
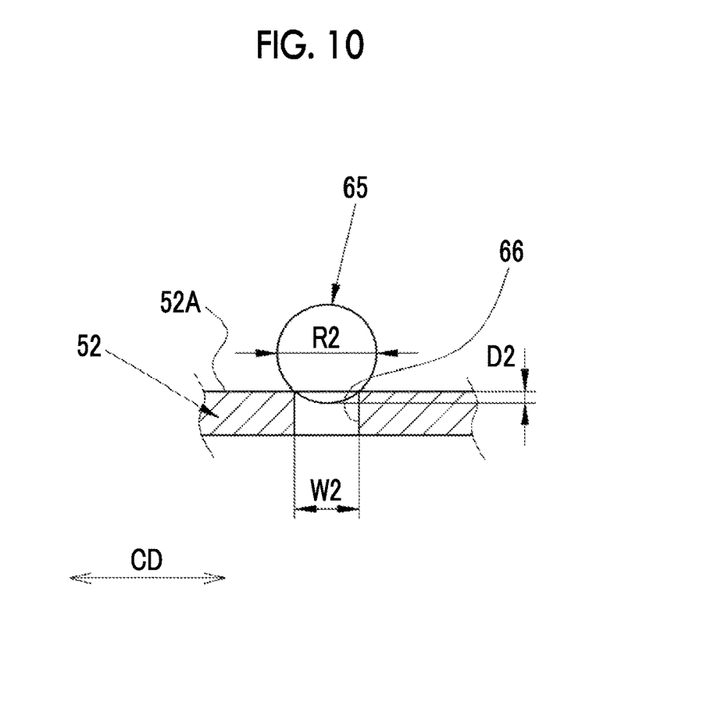
FIG. 10 is a cross-sectional view of main portions in a case in which the second spherical body is fitted to a second fitting portion.

The lens barrel body 21 is provided with a mounting portion 68 in which the second spherical body 65 and the second biasing member 67 are mounted. The mounting portion 68 is a recessed portion that is disposed at a position different from the position of the mounting portion 63 in the circumferential direction of the diaphragm operation ring 24. In the mounting portion 68, the second biasing member 67 is disposed on the distal end side of the lens barrel body 21 and the second spherical body 65 is disposed on the proximal end side of the lens barrel body 21. For example, a coil spring is used as the second biasing member 67 and the second biasing member 67 biases the second spherical body 65 to the slit plate 52. The biasing force of the first biasing member 62 is larger than the biasing force of the second biasing member 67.

A plurality of second fitting portions 66 are formed at the slit plate 52. The second fitting portion 66 is a rectangular slit, and the height H2 of the second fitting portion 66 in the radial direction of the diaphragm operation ring 24 is larger than the width W2 of the second fitting portion 66 in the circumferential direction CD of the diaphragm operation ring 24. Accordingly, as in the case of the first fitting portion 61, it is possible to prevent looseness in a case in which the second spherical body 65 is fitted to the second fitting portion 66. Therefore, machining accuracy can be improved. The second fitting portions 66 are formed so as to correspond to the respective second rotational positions at which a diaphragm value is set to the diaphragm value of the subordinate series, and the second spherical body 65 is fitted to the second fitting portion 66 in a case in which the diaphragm operation ring 24 is set to each second rotational position. Since twelve second rotational positions exist in this embodiment as described above, twelve second fitting portions 66 are formed at the slit plate 52.

In a case in which the position of the second spherical body 65 in the axial direction is regulated by the first surface 52A of the slit plate 52, the second spherical body 65 is positioned in the mounting portion 68. In a case in which the diaphragm operation ring 24 is set to each second rotational position, the second spherical body 65 protrudes toward the proximal end of the mounting portion 68 by the bias of the second biasing member 67 and is fitted to the second fitting portion 66. Further, since the second spherical body 65 collides with the edge portions of the second fitting portion 66 in a case in which the second spherical body 65 is fitted to the second fitting portion 66, vibration is generated.

In the slit plate 52, the width W1 of the first fitting portion 61 is larger than the width W2 of the second fitting portion 66 in the circumferential direction CD of the diaphragm operation ring 24. The outer diameter R1 of the first spherical body 60 is larger than the outer diameter R2 of the second spherical body 65 as described above. Particularly, a ratio of the width W1 of the first fitting portion 61 to the outer diameter R1 of the first spherical body 60 is substantially equal to a ratio of the width W2 of the second fitting portion 66 to the outer diameter R2 of the second spherical body 65. Accordingly, since a ratio of the volume of a portion of the first spherical body 60 fitted to the first fitting portion 61 to the entire volume of the first spherical body 60 is substantially equal to a ratio of the volume of a portion of the second spherical body 65 fitted to the second fitting portion 66 to the entire volume of the second spherical body 65, the holding ability of the first fitting portion 61 with respect to the first spherical body 60 is substantially the same as the holding ability of the second fitting portion 66 with respect to the second spherical body 65. In this embodiment, the height H1 of the first fitting portion 61 is equal to the height H2 of the second fitting portion 66.

Further, a fitting amount D1 (see FIG. 9) between the first spherical body 60 and the first fitting portion 61 is longer than a fitting amount D2 (see FIG. 10) between the second spherical body 65 and the second fitting portion 66. Here, the fitting amount D1 is the amount of a portion of the first spherical body 60 that enters the first fitting portion 61 from the first surface 52A of the slit plate 52, and specifically means the volume of a portion of the first spherical body 60 fitted to the first fitting portion 61 from the first surface 52A. Likewise, the fitting amount D2 is the amount of a portion of the second spherical body 65 that enters the second fitting portion 66 from the first surface 52A of the slit plate 52, and specifically means the volume of a portion of the second spherical body 65 fitted to the second fitting portion 66 from the first surface 52A.

Further, a third fitting portion 69 and a fourth fitting portion 70 are formed at the slit plate 52. The third and fourth fitting portions 69 and 70 are provided at positions different from the positions of the first and second fitting portions 61 and 66 in the circumferential direction CD. The third fitting portion 69 is formed so as to correspond to the third rotational position, and the first spherical body 60 is fitted to the third fitting portion 69 in a case in which the diaphragm operation ring 24 is set to the third rotational position. The fourth fitting portion 70 is formed so as to correspond to the third rotational position as in the case of the third fitting portion 69, and the second spherical body 65 is fitted to the fourth fitting portion 70 in a case in which the diaphragm operation ring 24 is set to the third rotational position. The third and fourth fitting portions 69 and 70 are rectangular slits, and the widths of the third and fourth fitting portions 69 and 70 in the circumferential direction CD and the heights of the third and fourth fitting portions 69 and 70 in the radial direction are equal to the width and height of the first fitting portion 61.

The actuation of the camera 10 will be described below. First, in a case in which the power lever 13 is operated by a user and a power supply is turned on, a power supply voltage is supplied to the respective parts of the camera 10. In a case in which the operation buttons (not shown) and the like are operated and an imaging mode is selected, the lens control unit 31 detects the rotational position of the diaphragm operation ring 24 from the detection signal of the sensor 26 and outputs the rotational position to the body control unit 37. In a case in which the mark 55 is positioned at the position of the indicator 54, the body control unit 37 determines that the diaphragm operation ring 24 is positioned at the third rotational position and instructs the AE processing unit 48 and the like to start the automatic exposure mode.

In a case in which the automatic exposure mode is started and an S1-ON signal is input to the body control unit 37 by the half-press operation of the release switch 14, the body control unit 37 determines a shutter speed and a diaphragm value on the basis of an integrated value calculated by the AE processing unit 48, controls the driving of the shutter motor 47, and actuates the diaphragm unit 36 to a diaphragm diameter, where the determined diaphragm value is obtained, through the lens control unit 31.

In a case in which the diaphragm value scale 53 is positioned at the position of the indicator 54, a signal representing a diaphragm value (main series or subordinate series) is obtained as a detection signal. The body control unit 37 controls the diaphragm diameter of the diaphragm unit 36 through the lens control unit 31 so that the diaphragm value represented by the detection signal is obtained.

In a case in which the user is to rotate the diaphragm operation ring 24, the user can set a diaphragm value by a click feeling, which is obtained through the diaphragm operation ring 24, without seeing the diaphragm value scales 53.

The click feeling is caused by vibration that is generated in a case in which the diaphragm operation ring 24 is positioned at the first rotational position and the first spherical body 60 is fitted to the first fitting portion 61 and a case in which the diaphragm operation ring 24 is positioned at the second rotational position and the second spherical body 65 is fitted to the second fitting portion 66. Since the size of the first spherical body 60 and the size of first fitting portion 61 are larger than the size of the second spherical body 65 and the size of the second fitting portion 66 in this embodiment, a click feeling obtained at the first rotational position is larger than a click feeling obtained at the second rotational position. Accordingly, click feelings, which are distinctly different from each other, are given at the first rotational positions corresponding to the main series and the second rotational positions corresponding to the subordinate series. Here, a size, which is mentioned here, is a dimension in the circumferential direction of the diaphragm operation ring. The user can identify whether the diaphragm value set by the rotation of the diaphragm operation ring 24 corresponds to the main series or the subordinate series by a difference in a click feeling.

Further, since the width W1 of the first fitting portion 61 is larger than the width W2 of the second fitting portion 66 and the outer diameter R1 of the first spherical body 60 is larger than the outer diameter R2 of the second spherical body 65, a click feeling generated at the second rotational position is reduced in comparison with a click feeling generated at the first rotational position but the holding ability obtained at the second rotational position is maintained to be the same as the holding ability obtained at the first rotational position. Accordingly, it is possible to prevent the second spherical body 65 from being separated from the second fitting portion 66 with a small magnitude of a force applied to the diaphragm operation ring 24 in a case in which the user matches the diaphragm operation ring 24 with a second rotational position corresponding to the subordinate series.

Further, since the first biasing member 62 for biasing the first spherical body 60 and the second biasing member 67 for biasing the second spherical body 65 are provided, it is possible to optimize a click feeling and holding ability by adjusting the biasing force for biasing the first spherical body 60 and the biasing force for biasing the second spherical body 65.

Furthermore, in a case in which the diaphragm operation ring 24 is rotated to the third rotational position, the first and second spherical bodies 60 and 65 are simultaneously fitted to the third and fourth fitting portions 69 and 70 and both the first and second spherical bodies 60 and 65 simultaneously generate vibration. Accordingly, a click feeling and holding ability, which are larger than click feelings and holding abilities obtained at the first and second rotational positions, are obtained. The user can recognize that the diaphragm operation ring 24 is set to the third rotational position corresponding to the automatic exposure mode through this click feeling. Further, since large holding ability can be obtained at the third rotational position, it is possible to prevent an exposure mode from being carelessly changed to the manual exposure mode from the automatic exposure mode.

The first to fourth fitting portions have been slits passing through the slit plate 52 in the embodiment, but are not limited thereto. The first to fourth fitting portions may be recessed portions that are recessed from the first surface 52A. Furthermore, the first to fourth fitting portions have a rectangular cross-sectional shape in the embodiment, but are not limited thereto. The first to fourth fitting portions may have a shape that allows the first and second spherical bodies 60 and 65 to be fitted thereto, and may also have, for example, a triangular cross-sectional shape, a cross-sectional shape of which rectangular end edges are chamfered, and the like.

Figure 11:
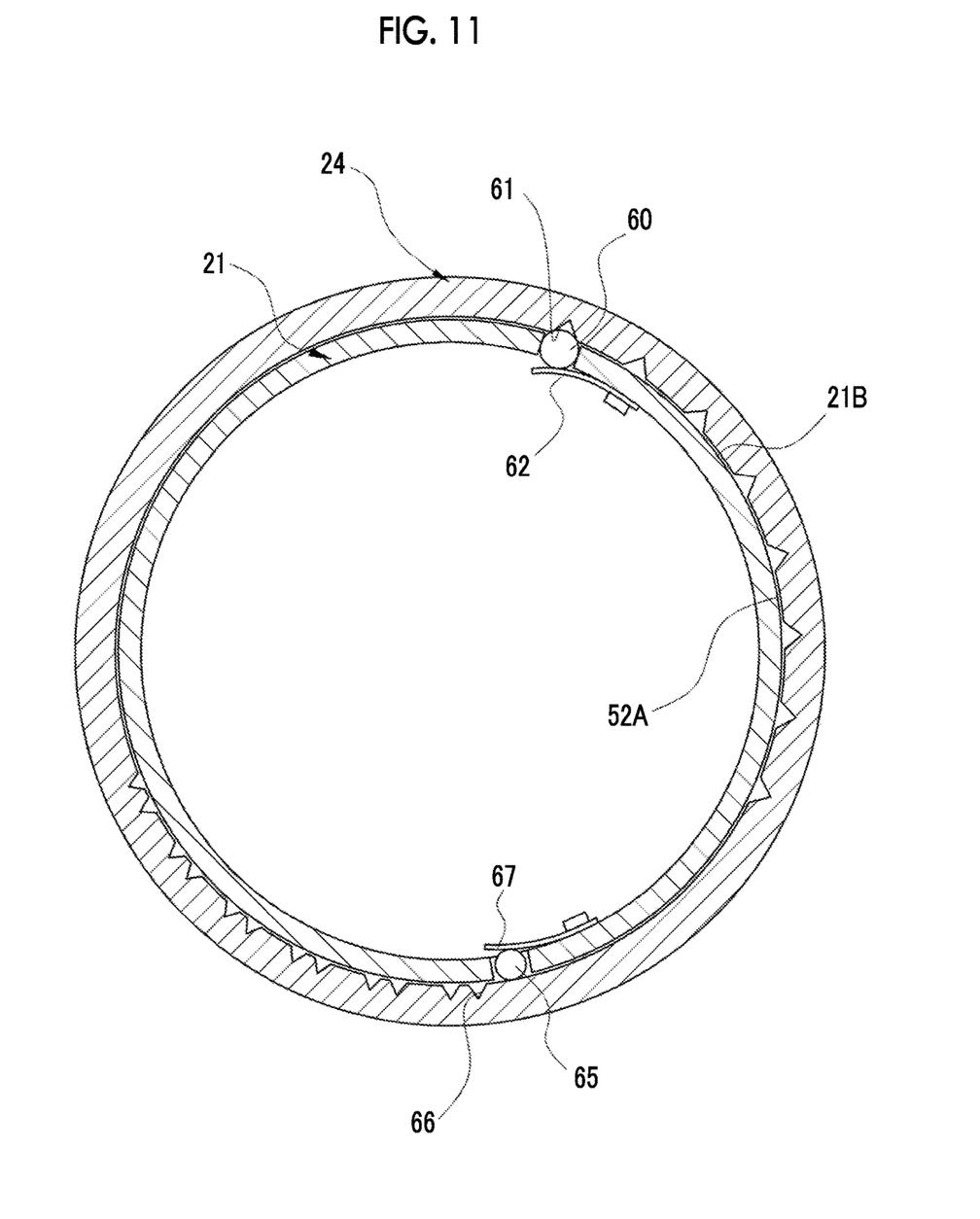
FIG. 11 is a cross-sectional view of main portions of a modification example in which first and second fitting portions are formed on the inner peripheral surface of a diaphragm operation ring.

In the embodiment, the first and second fitting portions have been formed on the first surface 52A orthogonal to the axis of the lens barrel body 21 and the first and second spherical bodies 60 and 65 are disposed between the first surface 52A and the second surface 21A facing the first surface 52A. However, the invention is not limited thereto. For example, as shown in FIG. 11, the inner peripheral surface of the diaphragm operation ring 24 may be used as a first surface 52B and the outer peripheral surface of the lens barrel body 21 may be used as a second surface 21B facing the first surface 52B. In this case, the first and second fitting portions 61 and 66 are formed on the first surface 52B, and the first and second spherical bodies 60 and 65 are disposed between the first and second surfaces 52B and 21B. For example, a leaf spring is used as each of the first and second biasing members 62 and 67, and the first and second biasing members 62 and 67 bias the first and second spherical bodies 60 and 65 to the diaphragm operation ring 24. In addition, the first surface 52B may be provided with the third and fourth fitting portions 69 and 70.

In the respective embodiments, the first and second fitting portions have been formed on the first surfaces 52A and 52B of the diaphragm operation rings 24. However, on the contrary, the first and second fitting portions may be formed on the second surfaces 21A and 21B of the lens barrel bodies 21. In this case, it is preferable that the diaphragm operation ring 24 is provided with the first and second biasing members 62 and 67.

The third and fourth fitting portions 69 and 70 have been provided in the respective embodiments, but the invention is not limited thereto. The fourth fitting portion 70 is not provided and only the third fitting portion 69 may be provided. In this case, it is preferable that the third fitting portion 69 is formed so as to have a width different from the widths of the first and second fitting portions in the circumferential direction of the diaphragm operation ring 24. Accordingly, a click feeling, which is different from click feelings obtained at the first and second rotational positions, is obtained at the third rotational position.

In the respective embodiments, a mirrorless single-lens digital camera has been described by way of example. However, the invention can also be applied to other lens-interchangeable digital cameras, such as a single-lens reflex digital camera. Further, in the digital camera of each embodiment, the camera body and the lens barrel have been separately formed and detachably connected to each other. However, the invention is not limited thereto, and may provide an imaging device of which a camera body and a lens barrel are integrated with each other.

EXPLANATION OF REFERENCES

10: lens-interchangeable digital camera
11: camera body
12: lens barrel
21: lens barrel body
21A: second surface
22: imaging optical system
24: diaphragm operation ring
52A: first surface
60: first spherical body
61: first fitting portion
62: first biasing member
65: second spherical body
66: second fitting portion
67: second biasing member
69: third fitting portion
70: fourth fitting portion

What is claimed is:

1. A lens barrel comprising:
a lens barrel body that receives a diaphragm;
a diaphragm operation ring that is rotatably mounted on the lens barrel body and is capable of being set to a plurality of first rotational positions where an AV value of the diaphragm is set to predetermined integer values and a plurality of second rotational positions where the AV value is set to predetermined fraction values;
first and second spherical bodies that are provided between the lens barrel body and the diaphragm operation ring and are disposed at positions different from each other in a circumferential direction of the diaphragm operation ring;
first fitting portions which are formed on one of the lens barrel body and the diaphragm operation ring so as to correspond to the respective first rotational positions and to which the first spherical body is fitted in a case in which the diaphragm operation ring is set to each of the first rotational positions; and
second fitting portions which are formed on one of the lens barrel body and the diaphragm operation ring so as to correspond to the respective second rotational positions and to which the second spherical body is fitted in a case in which the diaphragm operation ring is set to each of the second rotational positions,
wherein a fitting amount of the first spherical body with respect to the first fitting portion is larger than a fitting amount of the second spherical body with respect to the second fitting portion, and
wherein a ratio of the volume of a portion of the first spherical body fitted to the first fitting portion to the entire volume of the first spherical body is substantially equal to a ratio of the volume of a portion of the second spherical body fitted to the second fitting portion to the entire volume of the second spherical body.

2. The lens barrel according to claim 1, wherein the dimension of the first fitting portion is larger than the dimension of the second fitting portion in the circumferential direction of the diaphragm operation ring.

3. The lens barrel according to claim 1, wherein the diaphragm operation ring includes a first surface orthogonal to an axis of the lens barrel body, the lens barrel body includes a second surface that is orthogonal to the axis and faces the first surface, the first and second spherical bodies are disposed between the first and second surfaces, and the first and second fitting portions are formed on any one of the first and second surfaces.

4. The lens barrel according to claim 1, wherein the diaphragm operation ring is capable of being set to a third rotational position corresponding to an automatic exposure mode in which an automatic control of the diaphragm is performed, the lens barrel further comprising:
a third fitting portion which is formed on one of the lens barrel body and the diaphragm operation ring and to which the first spherical body is fitted in a case in which the diaphragm operation ring is set to the third rotational position; and
a fourth fitting portion which is formed on one of the lens barrel body and the diaphragm operation ring and to which the second spherical body is fitted in a case in which the diaphragm operation ring is set to the third rotational position.

5. An imaging device comprising:
the lens barrel according to claim 1.

* * * * *